US011221232B2

(12) United States Patent
Peat et al.

(10) Patent No.: US 11,221,232 B2
(45) Date of Patent: Jan. 11, 2022

(54) INSTALLATION OF METERS AND DETERMINING CONSUMPTION BASED ON METER DATA MANAGEMENT SYSTEM AND CERTIFIED METER CONFIGURATION DATA

(71) Applicant: Neptune Technology Group Inc., Tallassee, AL (US)

(72) Inventors: Brendan Peat, Brookhaven, GA (US); James Szendel, Bethlehem, GA (US)

(73) Assignee: Neptune Technology Group Inc., Tallassee, AL (US)

( * ) Notice: Subject to any disclaimer, the term of this patent is extended or adjusted under 35 U.S.C. 154(b) by 0 days.

(21) Appl. No.: 16/590,483

(22) Filed: Oct. 2, 2019

(65) Prior Publication Data

US 2020/0116523 A1 Apr. 16, 2020

Related U.S. Application Data

(60) Provisional application No. 62/743,657, filed on Oct. 10, 2018.

(51) Int. Cl.
*G01D 4/00* (2006.01)
*H04Q 9/00* (2006.01)
*G06Q 50/06* (2012.01)

(52) U.S. Cl.
CPC .............. *G01D 4/004* (2013.01); *H04Q 9/00* (2013.01); *G06Q 50/06* (2013.01); *H04Q 2209/60* (2013.01)

(58) Field of Classification Search
CPC ...... G01D 4/004; H04Q 9/00; H04Q 2209/60; G06Q 50/06
See application file for complete search history.

(56) References Cited

U.S. PATENT DOCUMENTS

| 4,803,484 | A | * | 2/1989 | Schutrum | G01R 11/02 324/96 |
| 5,870,140 | A | * | 2/1999 | Gillberry | G01D 4/008 348/160 |
| 6,867,707 | B1 | | 3/2005 | Kelley et al. | |
| 7,702,594 | B2 | | 4/2010 | Scoggins et al. | |
| 8,269,650 | B2 | | 9/2012 | Cornwall et al. | |
| 8,896,461 | B2 | | 11/2014 | Angelis et al. | |
| 8,964,974 | B2 | | 2/2015 | Holmdahl | |
| 9,002,723 | B2 | | 4/2015 | King et al. | |
| 9,664,529 | B2 | | 5/2017 | Shah et al. | |
| 2005/0267898 | A1 | * | 12/2005 | Simon | G01D 4/002 |
| 2006/0170409 | A1 | * | 8/2006 | Kagan | G01R 35/04 324/74 |

(Continued)

*Primary Examiner* — Amine Benlagsir
(74) *Attorney, Agent, or Firm* — Snyder, Clark, Lesch & Chung, LLP

(57) ABSTRACT

A device, a method, and a non-transitory storage medium are described in which a meter installation and billing verification service is described. The meter installation service includes validating configuration data pertaining to a water meter to be installed based on certified configuration data. The certified configuration data includes the number of dials, the placement of the decimal, and the unit of measure. The certified configuration data may also include a meter size and a lay length. The billing verification service includes validating configuration data based on certified configuration data to ensure proper billing.

20 Claims, 16 Drawing Sheets

(56) References Cited

U.S. PATENT DOCUMENTS

| | | | |
|---|---|---|---|
| 2007/0057814 A1* | 3/2007 | Goldberg | G01D 5/39 340/870.02 |
| 2008/0218164 A1* | 9/2008 | Sanderford | G01D 4/008 324/260 |
| 2011/0251807 A1* | 10/2011 | Rada | G01D 4/00 702/61 |
| 2012/0089494 A1* | 4/2012 | Danezis | G06Q 50/06 705/34 |
| 2013/0031115 A1* | 1/2013 | Jhang | G01D 4/002 707/756 |
| 2014/0225742 A1 | 8/2014 | Wenger et al. | |
| 2017/0356779 A1* | 12/2017 | Stuyvenberg | F16K 31/086 |
| 2017/0364734 A1* | 12/2017 | Melugin | G01D 4/008 |
| 2018/0052008 A1* | 2/2018 | Maman | G01D 4/008 |

* cited by examiner

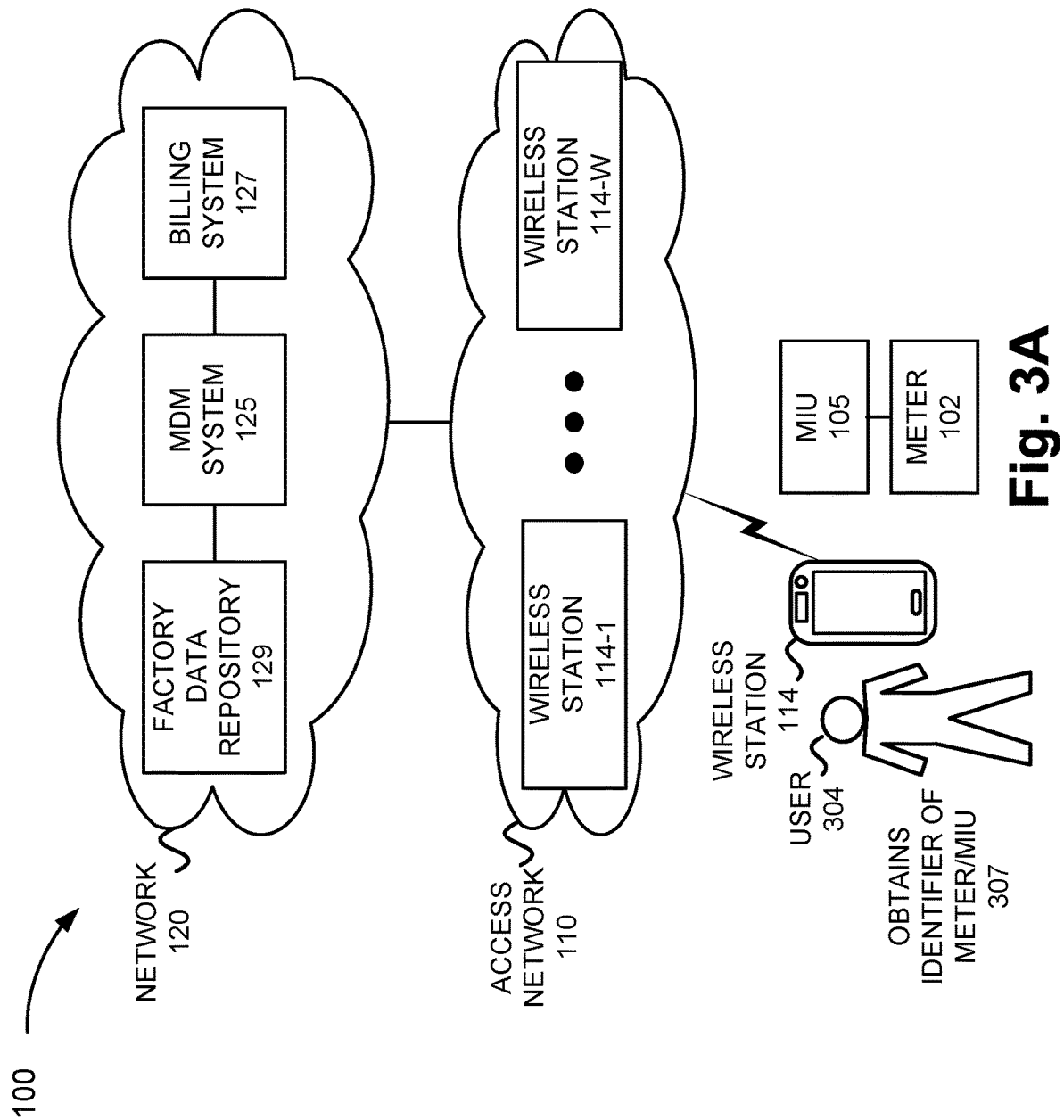

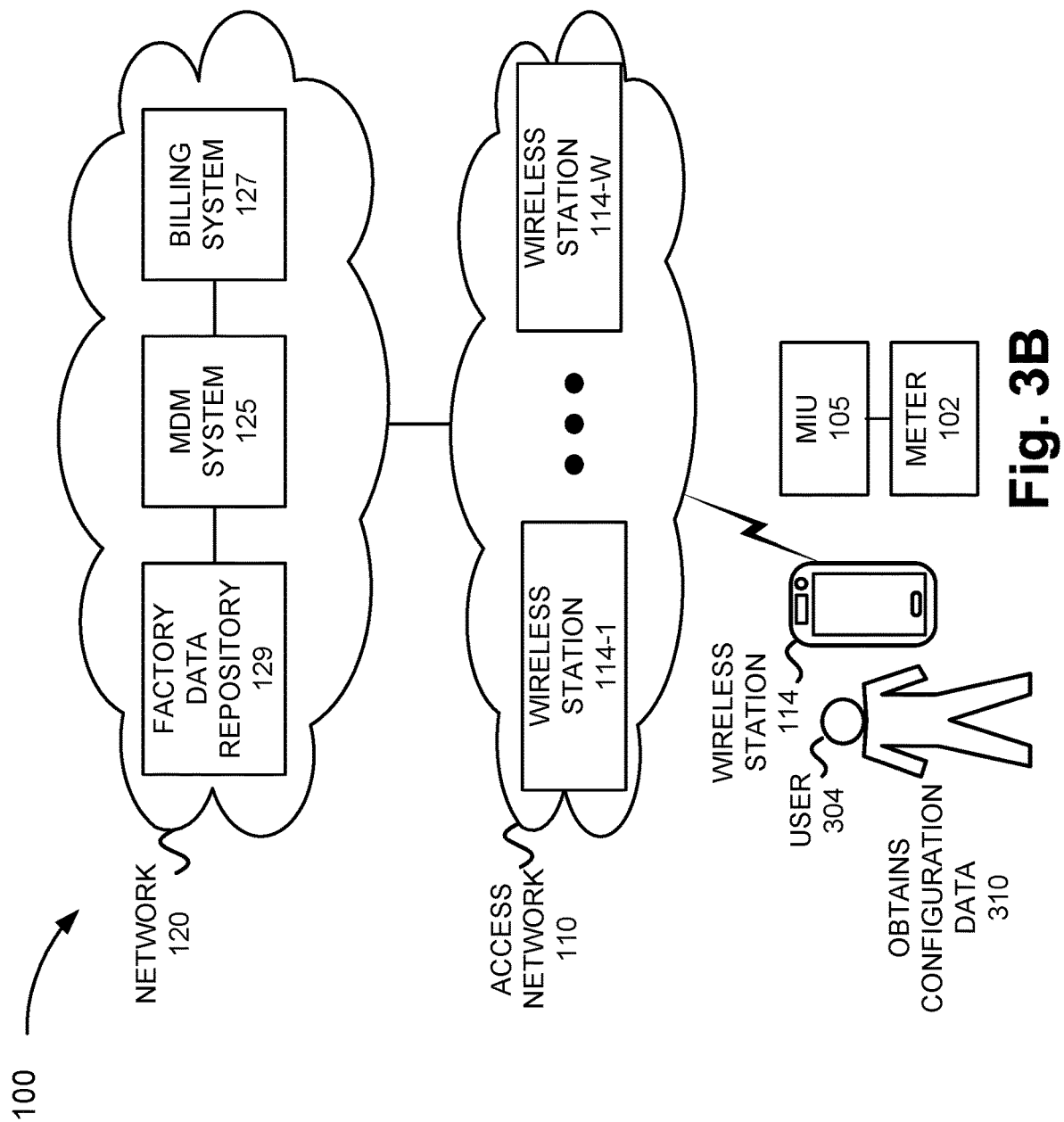

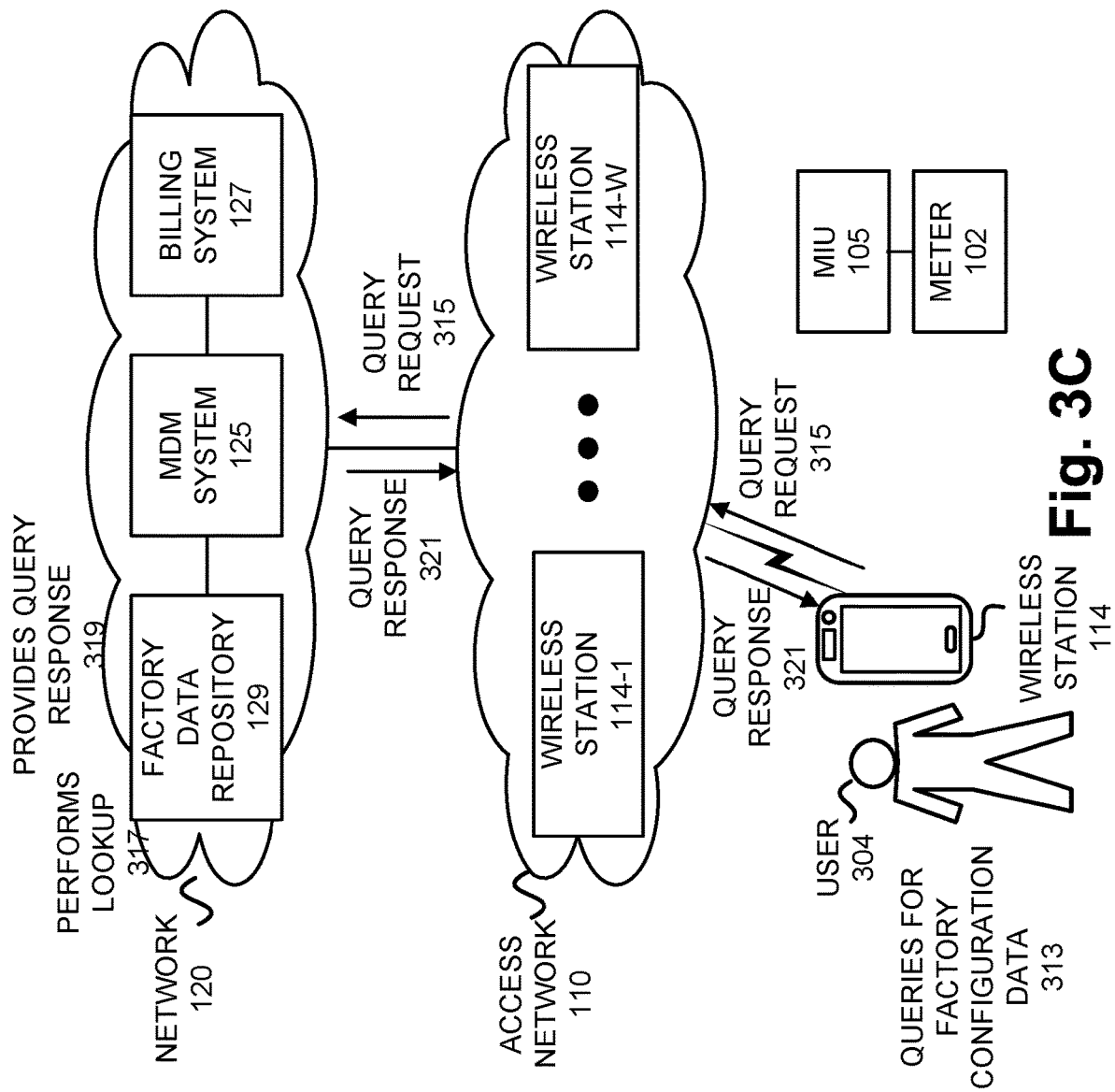

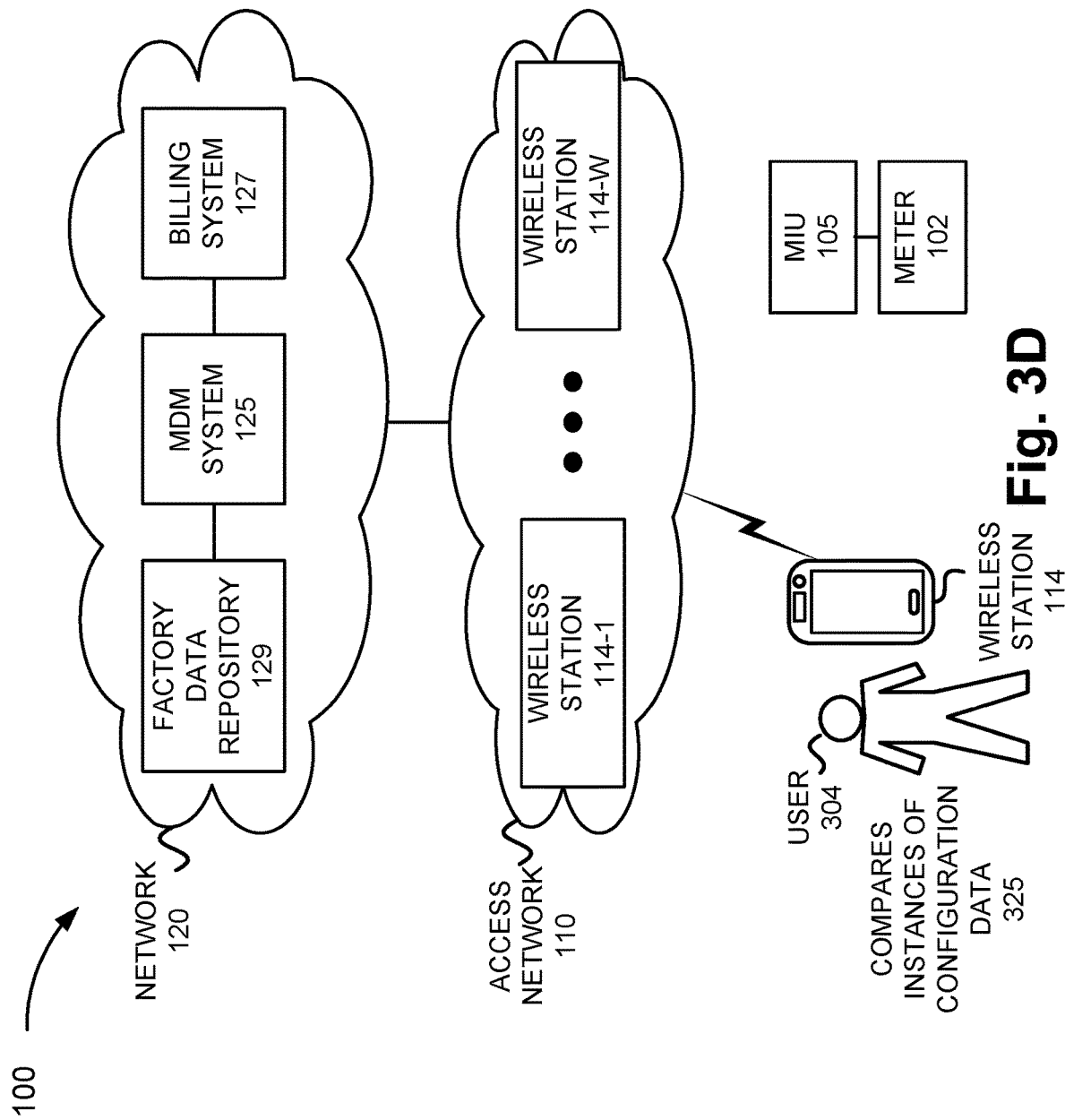

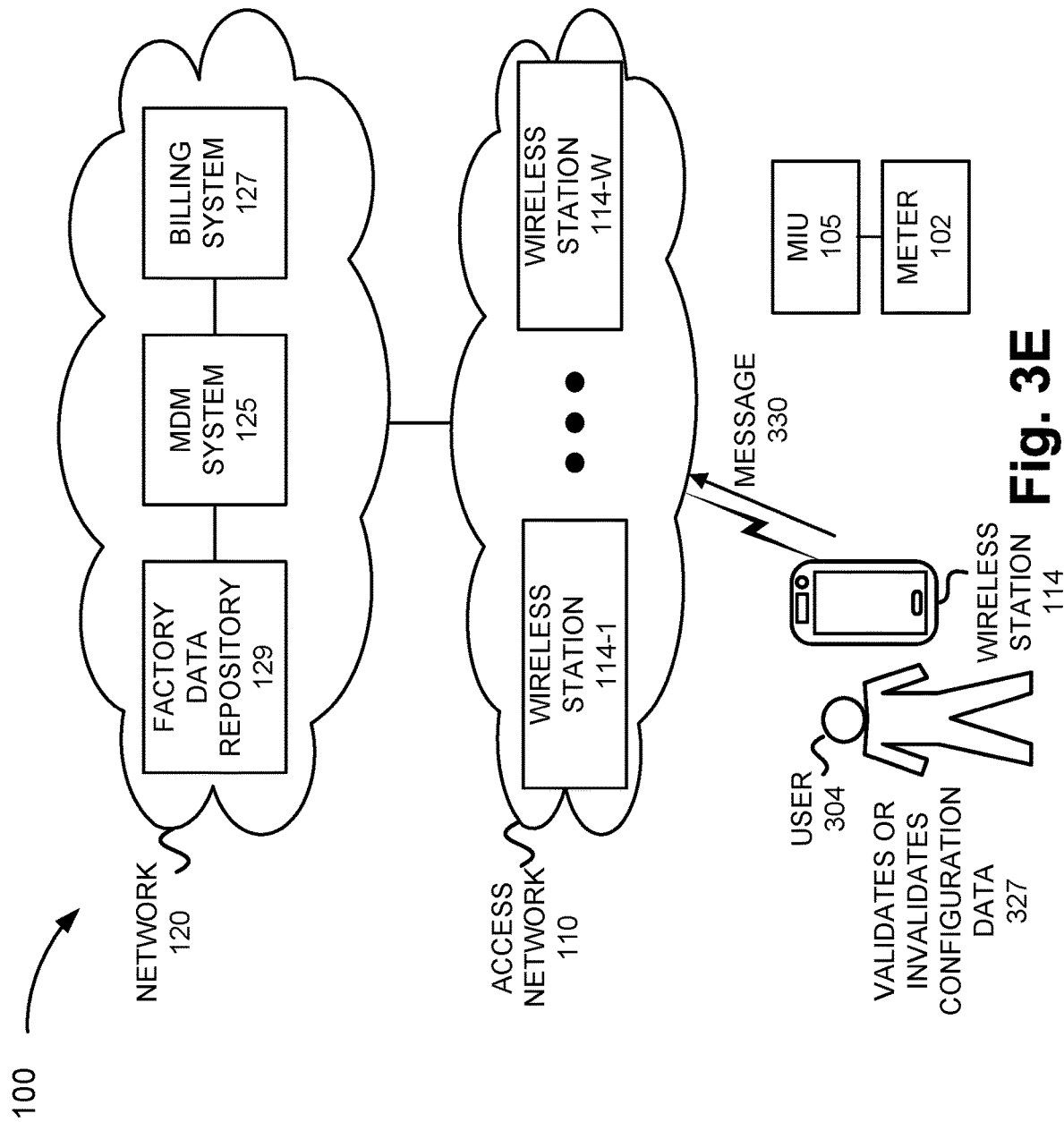

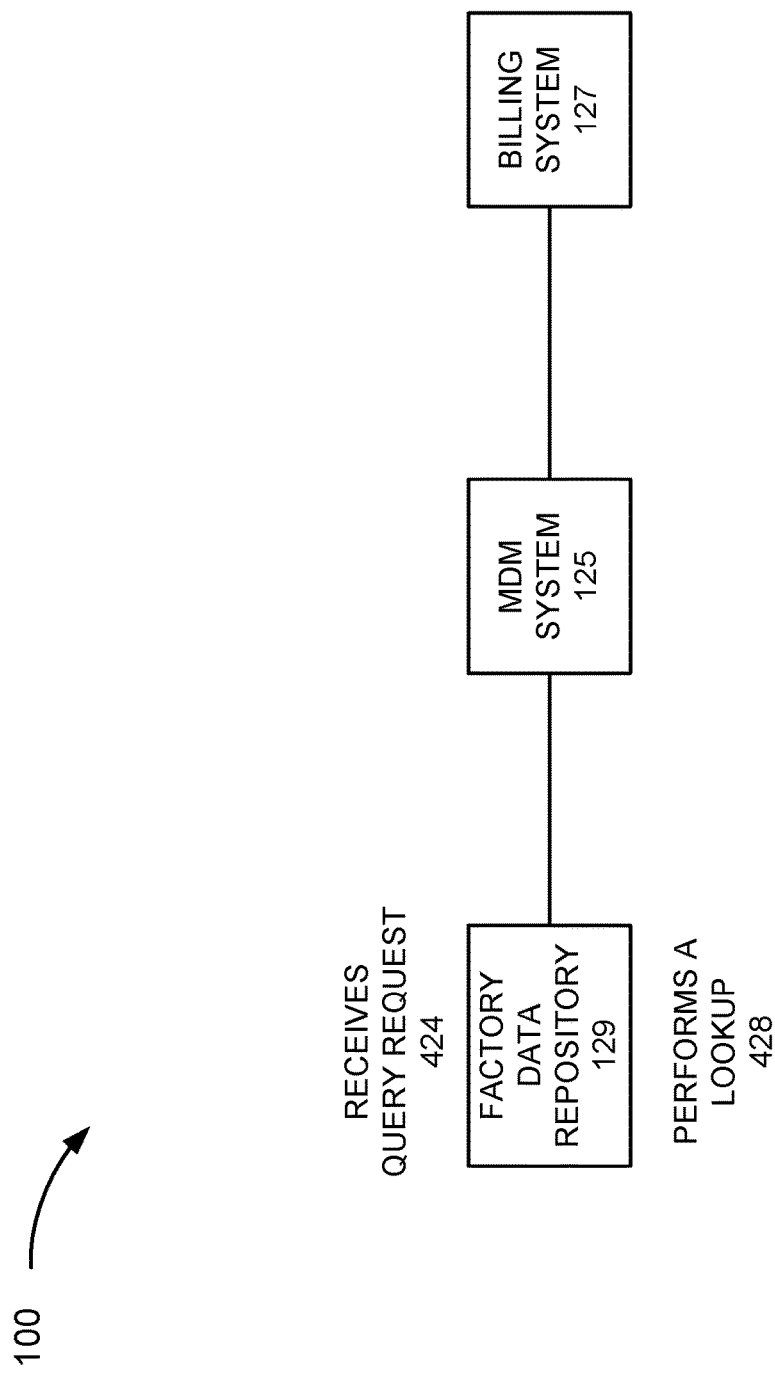

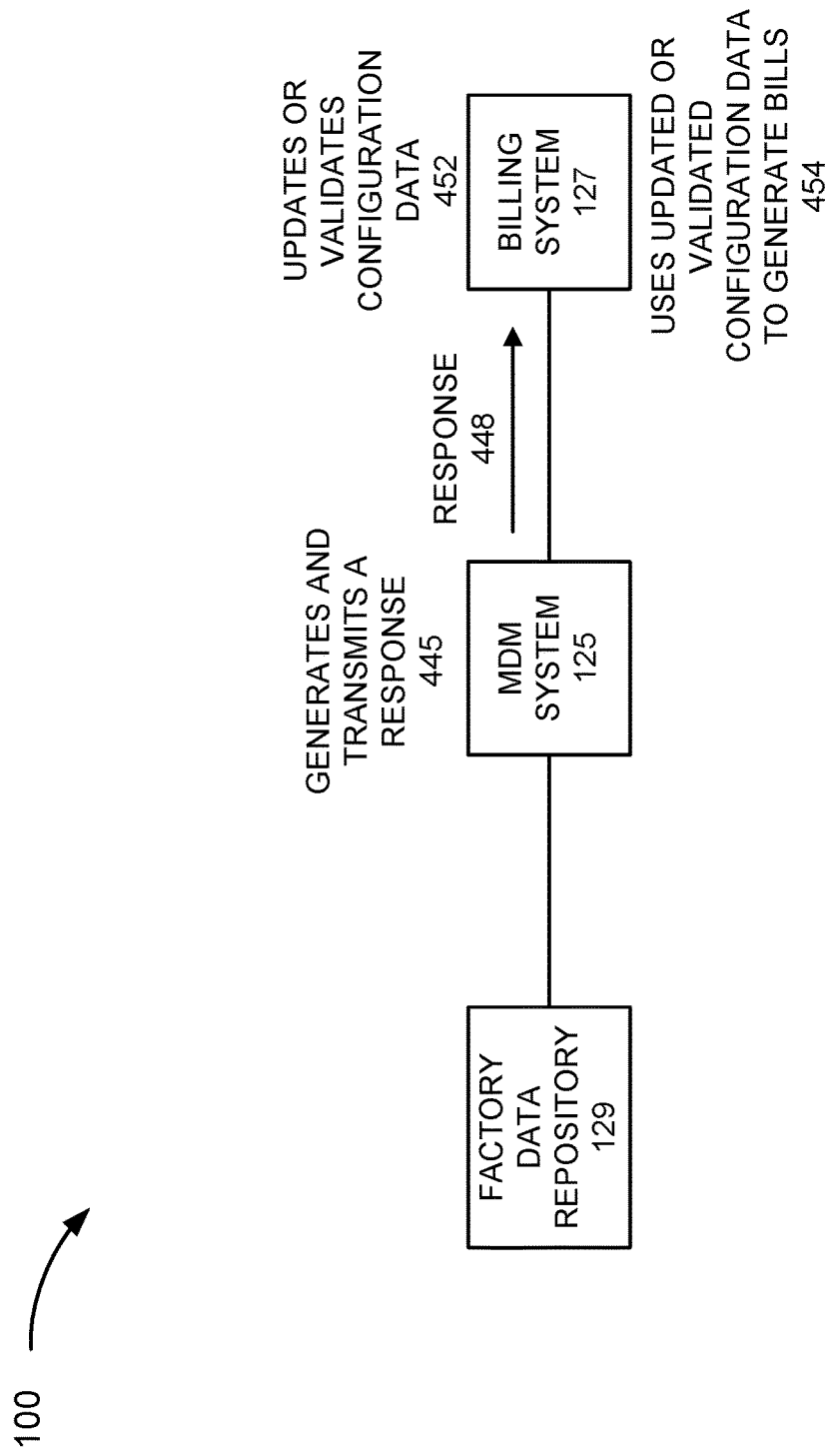

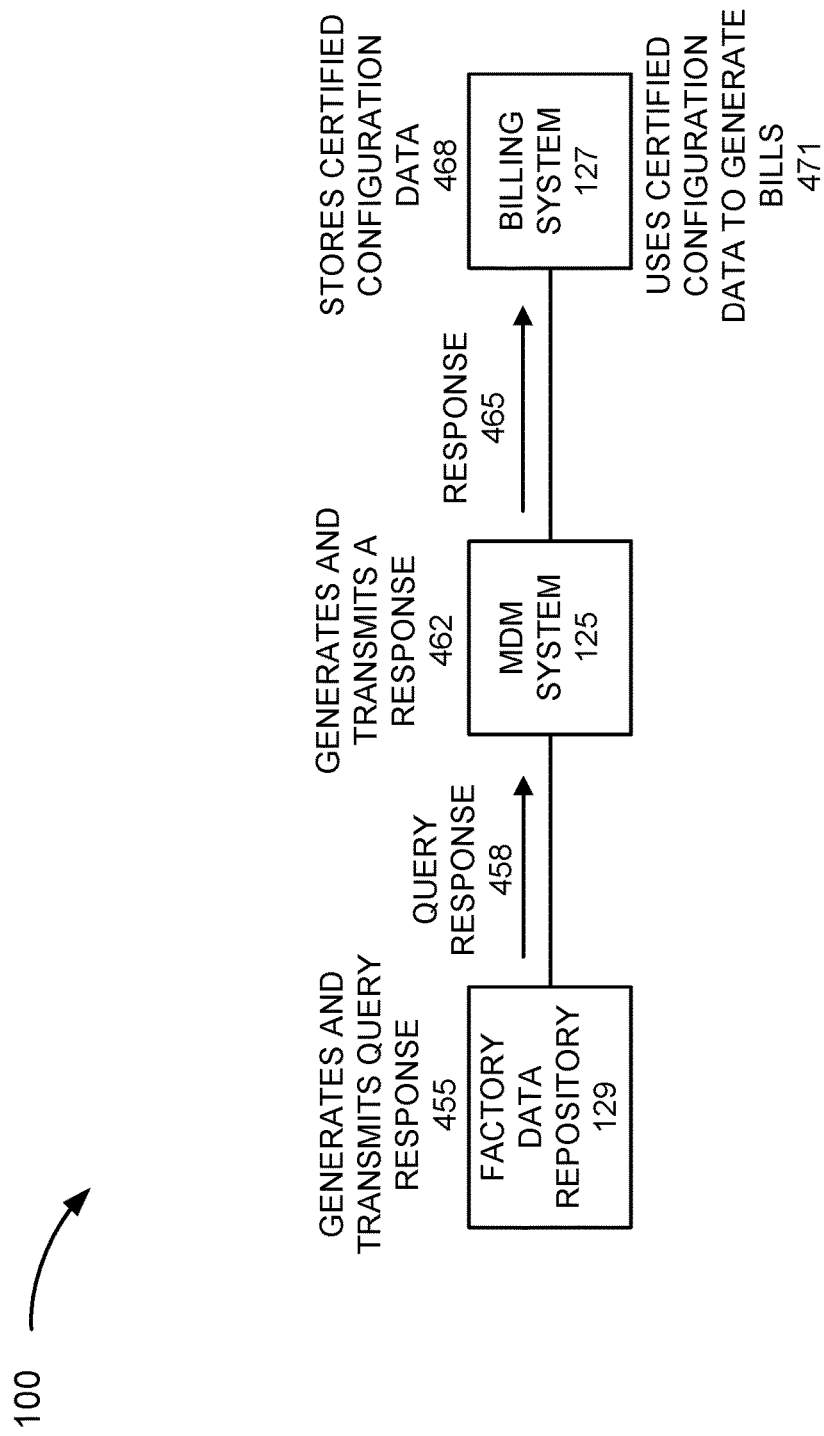

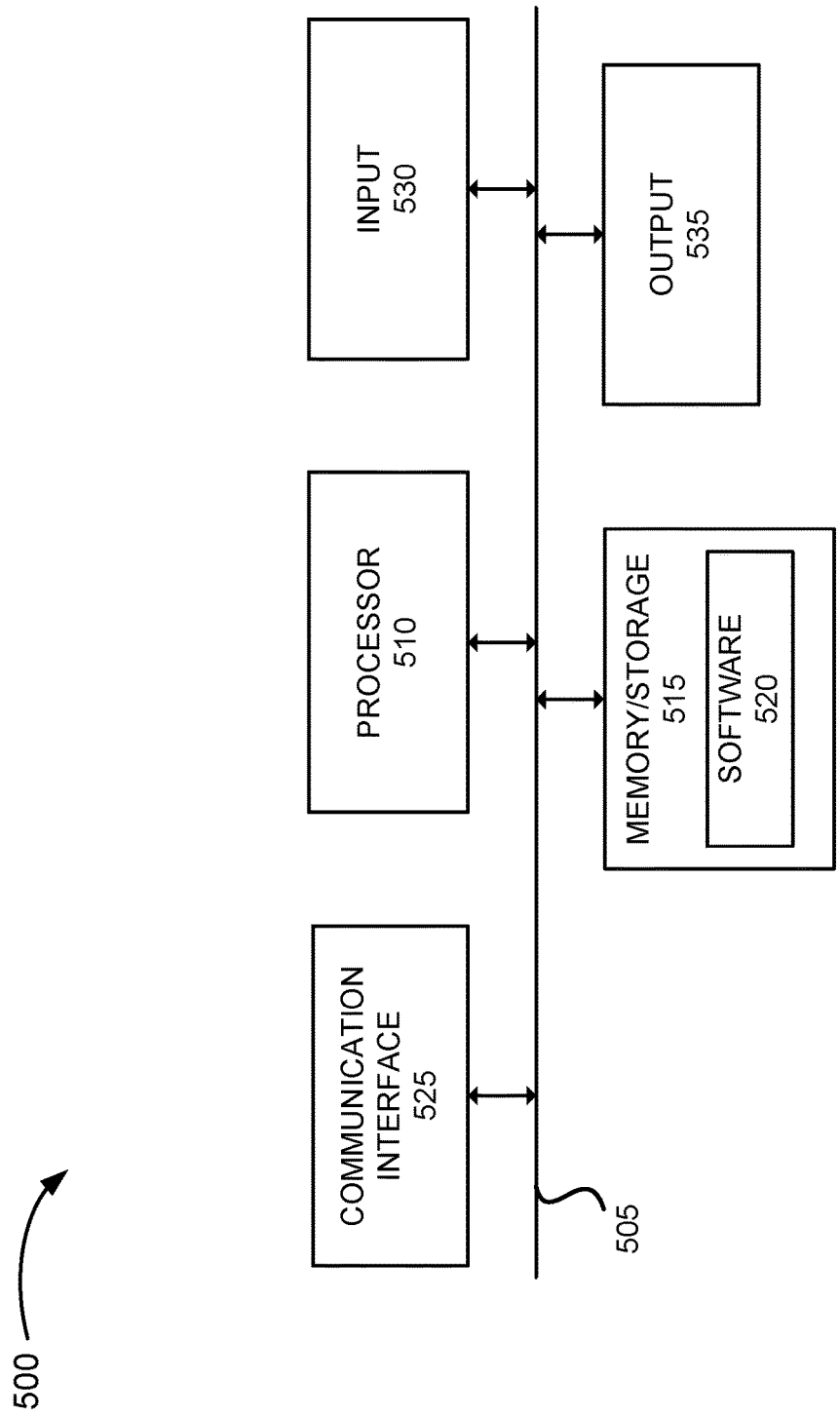

INSTALLATION OF METERS AND DETERMINING CONSUMPTION BASED ON METER DATA MANAGEMENT SYSTEM AND CERTIFIED METER CONFIGURATION DATA

CROSS-REFERENCE TO RELATED APPLICATION

This application claims priority under 35 U.S.C. § 119, based on U.S. Provisional Application No. 62/743,657, filed Oct. 10, 2018, the disclosure of which is hereby incorporated by reference herein.

BACKGROUND

Utility companies and other entities operate distribution systems for various resources (e.g., water, gas, electricity, chemicals, etc.) to deliver these resources to customers connected to the distribution systems. A meter may be used at each point the resource is removed and/or provided from the distribution system to a customer in order to measure usage. Many metering systems use wireless communications to report meter readings to a backend system via a communication network. The backend system typically includes a network device that manages billing.

BRIEF DESCRIPTION OF THE DRAWINGS

FIGS. 3A-3E are diagrams illustrating an exemplary process of an exemplary embodiment of the meter installation and billing verification service;

FIGS. 4A-4F are diagrams illustrating other processes of an exemplary embodiment of the meter installation and billing verification service;

FIG. 5 is a diagram illustrating exemplary components of devices illustrated and described herein;

DETAILED DESCRIPTION OF PREFERRED EMBODIMENTS

Figure 1:
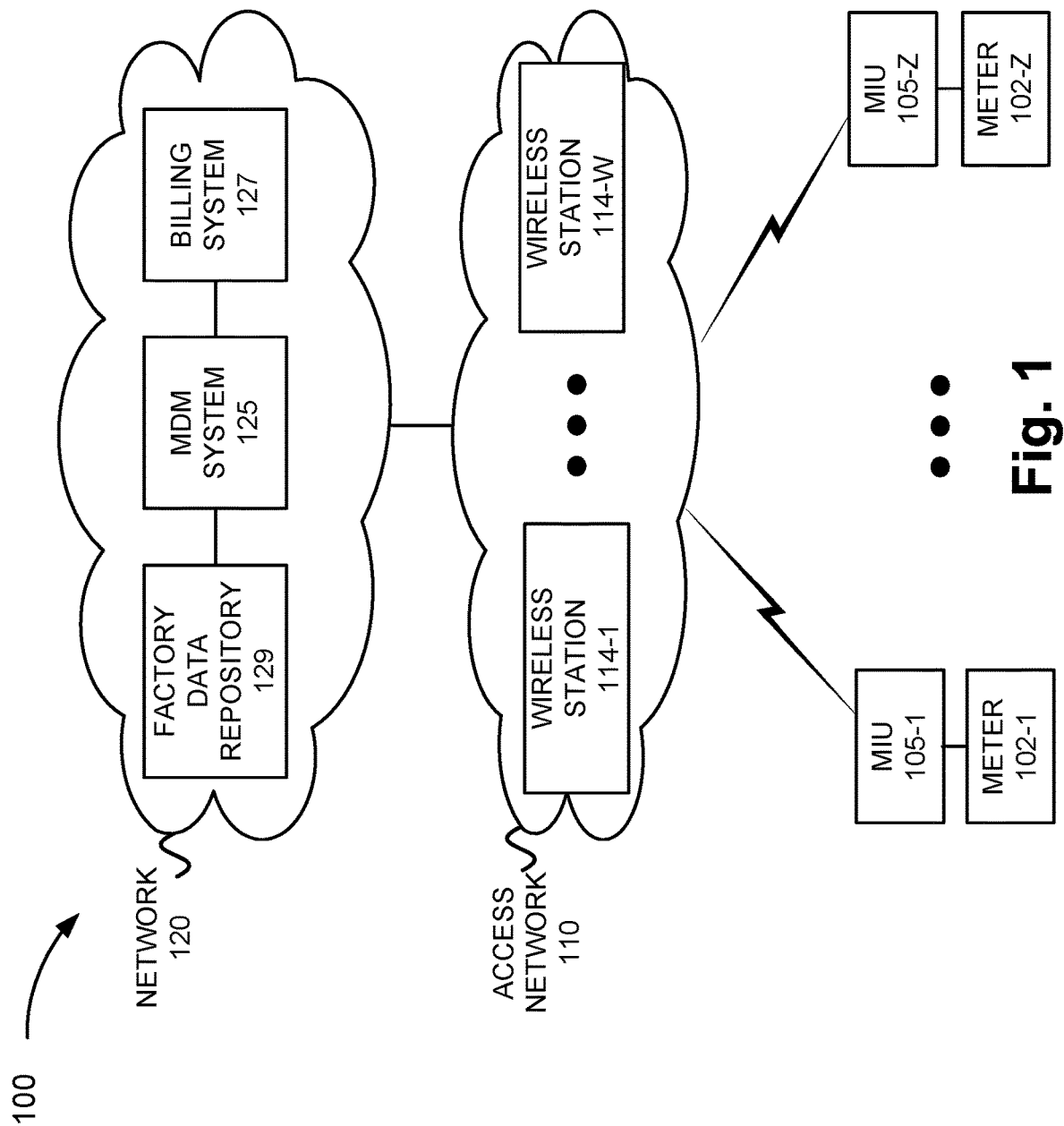
FIG. 1 is a diagram illustrating an exemplary environment in which an exemplary embodiment of a meter installation and billing verification service may be implemented.

The following detailed description refers to the accompanying drawings. The same reference numbers in different drawings may identify the same or similar elements. Also, the following detailed description does not limit the invention.

Meters that measure usage of a resource, such as a utility resource (e.g., water, gas, electricity, etc.) or another type of resource (e.g., chemical, etc.) are widely used. Further, meters have been combined with electronic components to facilitate communication between the meters and backend systems via a network. For example, a meter interface unit (MIU) may include a transmitter that is configured to wirelessly transmit usage information and other types of meter-related information (e.g., leak information, reverse flow detection, etc.). The MIU may also include a receiver that is configured to wirelessly receive information and commands. For example, the meter and the MIU may be a part of an automated meter reading (AMR) system, an advanced metering system (AMS), an advanced meter infrastructure (AMI), or another type of architecture associated with a utility company or another entity.

The MIU may use one or multiple networks for communication. For example, the MIU may transmit information to a mobile transceiver of a wireless network. The mobile transceiver may be implemented as a handheld device, which may be operated by a user (e.g., an employee of a utility company). Alternatively, for example, the mobile transceiver may be implemented as a vehicle mount to a utility vehicle. Additionally, or alternatively, the MIU may communicate with a network device of a fixed network or a proprietary network of an entity (e.g., a utility company). For example, the network device (e.g., often referred to as "gateway" or a "collector") may be physically situated in proximity to the MIU. The mobile transceiver and the network device may be managed by the entity (e.g., a utility company) of the system.

The system further includes a backend system that manages billing based on the meter data received from the meters via the network. In order to accurately represent usage for billing and customer presentment, various types of configuration data are required. For example, in the context of a water meter and water usage, the number of dials, the placement of the decimal with respect to a consumption value, and the unit of measure are required to interpret the meter reading data relating to water consumption. The combination of these values (e.g., number of dials, etc.) allows the backend system to calculate the amount of water consumed. Additionally, many utility companies capture usage and bill in cubic feet of water consumed, but most consumers do not understand this metric. The utility companies may convert this metric of water usage to a more universally understood measurement (e.g., gallons) based on the configuration data.

Unfortunately, a billing system may not store the configuration data relating to the meters, is unable to make such configuration data available to a meter data management (MDM) system, or stores inaccurate configuration data. The MDM system may ingest, store, and analyze the meter data, as well as provide interactive graphical user interfaces (GUIs) that can make available various types of information to personnel of a utility company, customers, etc. While the MDM system may allow an end user to manually enter the configuration data, such an approach can lead to inaccurate or missing configuration data.

Additionally, during normal usage of a meter/MIU in the field, an improperly sized meter for its intended usage can lead to inaccurate measurement readings of resource usage. For example, an improperly sized water meter can operate incorrectly due to a water flow usage to which it is exposed relative to its water flow characteristics that the water meter is designed to support. This circumstance stems from an improper installation of the meter. For example, when an installer does not verify that the meter being installed is properly configured, or the installer attempts to verify that the meter being installed is properly configured but has access to inaccurate data, an improperly sized meter can be installed. Further, an improperly sized meter can negatively impact longevity of the meter, decreased accuracy, and issues identifying when the meter should be replaced.

According to exemplary embodiments, a network device provides a meter installation and billing verification service. According to an exemplary embodiment, the network device includes an MDM system that uses configuration data of a meter/MIU to support the services, as described herein. According to an exemplary implementation, the configuration data is generated and stored as a part of the manufacturing process of the meter/MIU. For example, the configuration data may be stored in a data repository associated with the manufacturer of the meter/MIU (referred to herein as a "factory data repository"). The configuration data is certified for data accuracy, integrity, and/or reliability (referred to herein as "certified configuration data").

According to an exemplary embodiment, the certified configuration data includes data that indicates the number of dials, the placement of the decimal, and a unit of measure pertaining to a meter. For example, the number of dials may correspond to the number of digits on a display of the meter, the number of digits of an odometer of the meter, or the number of round reading dials of the meter. Also, for example, the placement of the decimal may indicate the decimal place value pertaining to the digits of a meter reading. By way of further example, the number of digits to (virtually) place or move the decimal (e.g., from right to left; from left to right) may be indicated. Additionally, for example, the unit of measure may indicate usage in terms of cubic feet, cubic meter, gallons, or another unit of measure.

According to an exemplary embodiment, the certified configuration data further includes an identifier that identifies the meter/MIU. For example, the identifier may be an equipment identifier labeled or printed on the meter/MIU or an identifier stored in a register of the MIU. The identifier may be unique or not unique relative to other meters/MIUs.

According to other exemplary embodiments, the certified configuration data includes additional or different instances of data indicating a configuration of the meter/MIU. For example, the certified configuration data may indicate a lay length, meter size (e.g., a diameter of a hole or opening where water runs through), a type of meter (e.g., ultrasonic, straight-reading, round-reading, etc.), location information (e.g., Global Positioning System (GPS) coordinates), an image of a register for validating reading/odometer, meter thread size, image of previous register reading that was removed and/or another type of configuration data relating to the meter that may be pertinent to meter installation and billing for measured usage.

According to exemplary embodiments of the billing verification service, the MDM system receives a request to validate configuration data associated with a meter. According to an exemplary embodiment, the request includes an identifier that identifies the meter/MIU and installed-based configuration data stored by or accessible by a billing system (e.g., a billing system of a water utility company, etc.). According to an exemplary embodiment, in response to receiving the request, the MDM system generates a query request, which includes the identifier, and queries a factory data repository. The MDM system obtains the certified configuration data of the meter/MIU as a result of the query request.

The MDM system compares the installed-based configuration data received from the billing system against the certified configuration data obtained from the factory data repository. In this way, the MDM system may determine whether the configuration data from the billing system is valid or not. When the MDM system determines that the configuration data is not valid, the MDM system may invoke a corrective procedure (e.g., alerting the utility system, personnel, etc.). The MDM system also generates and transmits a response to the billing system that indicates whether the installed-based configuration data is valid or not. When the installed-based configuration data is determined to be invalid, the response includes the certified configuration data, and the billing system updates its configuration data with the certified configuration data. When the MDM system determines that the configuration data is valid, the billing system can provide its billing services based on the validated configuration data.

According to other exemplary embodiments, when the billing system does not store or have access to the installed-based configuration data, the request from the billing system does not include the installed-based configuration data. However, the MDM system queries the factory data repository using the identifier to obtain the certified configuration data, and provides the certified configuration data to the billing system, as described herein.

According to other exemplary embodiments, the certified configuration data may be used to support a meter installation verification service. For example, a field technician may capture, via a mobile device, an identifier of the meter/MIU. According to an exemplary embodiment, the mobile device uses the identifier to perform a query with the factory data repository, and obtain the certified configuration data. The mobile device compares the certified configuration data to configuration data stored by the utility company (e.g., configuration data included in an installation order, etc.), and determines whether a properly configured meter/MIU is being installed. The mobile device informs the technician, via a graphical user interface of the mobile device, that the configuration data matches or that the configuration data does not match depending on the outcome of the comparison.

According to another exemplary embodiment, the mobile device transmits the identifier of the meter/MIU, along with installation-based configuration data, to the MDM system. The MDM system queries the factory data repository based on the identifier, and obtains the certified configuration data of the meter/MIU. The MDM system compares the installation-based configuration data against the configuration data obtained from the factory data repository. Based on a result of the comparison, the MDM system determines whether these instances of configuration data match or not. The MDM system communicates the result to the technician via the mobile device.

As a result, the meter installation and billing verification service may minimize billing errors associated with meter reading data obtained from meters/MIUs based on the use of the certified configuration data. Additionally, the meter installation and billing verification service may minimize improper installations of meters/MIUs and subsequent maintenance of the meters/MIUs (e.g., evaluation of wear and/or replacement of the meters/MIUs, etc.).

FIG. 1 is a diagram illustrating an exemplary environment 100 in which an exemplary embodiment of the services described herein may be implemented. As illustrated, environment 100 includes meters 102-1 through 102-Z, in which Z>1 (referred to collectively as meters 102 and individually (or generally) as meter 102) and MIUs 105-1 through 105-Z (referred to collectively as MIUs 105 and individually (or generally) as MIU 105). Environment 100 further includes an access network 110 and a network 120. Access network 110 includes wireless stations 114-1 through 114-W, in which W>1 (referred to collectively as wireless stations 114 and individually (or generally) as wireless station 114). Network 120 includes an MDM system 125, a billing system 127, and a factory data repository 129.

According to other embodiments, environment 100 may include additional networks and/or different types of networks than those illustrated and described herein. The number, the type, and the arrangement of devices in access networks 110 and network 120 are exemplary. The number and the arrangement of meters 102 and MIUs 105 are exemplary.

A network device, a network element, or a network function (referred to herein simply as a network device) may be implemented according to one or multiple network architectures (e.g., a client device, a server device, a peer device, a proxy device, a cloud device, a virtualized function, etc). Additionally, the network device may be implemented according to various computing architectures, such as a centralized computing architecture, a distributed computing architecture, a cloud computing architecture (e.g., an elastic cloud, a private cloud, a public cloud, etc.), a fog computing architecture, or another type of computing architecture.

Environment 100 may include communication links between various network devices and networks. Additionally, MIUs 105 and devices of access networks 110 may establish communication links. The number, the type, and the arrangement of communication links illustrated in environment 100 are exemplary. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network.

Meter 102 may include a device that is configured to measure usage of a resource. For example, meter 102 may be a water meter or another type of meter, as previously described. Various implementations of meter 102 may use different measurement technologies (e.g., ultrasonic sensing, magnetic-driven, positive displacement, etc.) to measure usage of the particular resource, such as water, and so forth.

MIU 105 may include an electronic device that collects, analyzes, and stores data from meter 102. According to one exemplary implementation, MIU 105 may be integrated into meter 102. According to another exemplary implementation, MIU 105 (or portion thereof) may be a separate component from meter 102. For example, the separate component may be communicatively coupled to meter 102 (or a remaining portion of MIU 105) via a cable or another type of connector. According to an exemplary implementation, MIU 105 may include a wireless transmitter and a wireless receiver for communication. MIU 105 may be configured to access and use multiple access networks 110.

Access network 110 may include one or multiple wireless networks that include one or multiple wireless (e.g., radio) technologies that support a meter system and the services as described herein. According to various exemplary embodiments, access network 110 may include a Long Range wide area network (LoRaWAN), a Sigfox low-power WAN (LP-WAN), an Ingenu machine network, an Evolved UMTS Terrestrial Radio Access Network (E-UTRAN) (e.g., a Fourth Generation radio access network (4G RAN)), a 4.5G RAN, a next generation RAN (e.g., a 5G-access network), a public land mobile network (PLMN), a Worldwide Interoperability for Microwave Access (WiMAX) network, a mobile transceiver network, a proprietary wireless network (e.g., owned and operated by a utility company (e.g., a water utility company, etc.)), and/or other types of networks, such as a wired network, the Internet, a wide area network (WAN), a metropolitan area network (MAN), a data transport network, a backhaul network, and/or other type of wired/wireless network.

Depending on the implementation, access network 110 may include various types of wireless stations 114, such as, for example, an evolved Node B (eNB), a next generation Node B (gNB), an evolved Long Term Evolution (eLTE) eNB, a base station, a gateway, a collector, a vehicle-mounted device, a drone, a mobile or handheld user device (e.g., operated by a user or a technician associated with a utility company, such as a water company), or another type of wireless node. Wireless station 114 may operate in a "one-way" communication mode, a "two-way" communication mode, or a combination of both in relation to MIU 105 and network devices of network 120 (e.g., MDM system 125, billing system 127). According to some exemplary implementations, wireless station 114 may also connect to MIU 105 via a wired connection and/or another suitable communication medium (e.g., infrared, optical, etc.). For example, a utility employee/technician may connect a mobile device (e.g., a tablet, a handheld device, etc.) to MIU 105 via a cable or other suitable connector.

Network 120 may include a network that provides access to MDM system 125, billing system 127, and factory data repository 129. For example, network 120 may be implemented to include a WAN, a MAN, the Internet, an Intranet, an Internet Protocol (IP) network, a wired network, a wireless network, a private network, and/or another suitable network.

MDM system 125 includes a network device that provides the meter installation verification service, the billing verification service, or both, as described herein. According to an exemplary embodiment, MDM system 125 includes a communication interface that allows for communication with factory data repository 129. MDM system 125 includes logic that queries factory data repository 129 for certified configuration data. MDM system 125 includes logic that compares the certified configuration data with configuration data from a different source, and determines whether these instances of configuration data match. MDM system 125 includes logic that generates and transmits a response indicating a result of the comparison. For example, when the instances of configuration data match, MDM system 125 may transmit a response that indicates the configuration data is valid. Alternatively, for example, when the instances of configuration data do not match, MDM system 125 may transmit a response that indicates the configuration data is invalid. The response may further include the certified configuration data. MDM system 125 may transmit responses to various devices including, for example, billing system 127, a mobile transceiver device (e.g., a mobile device operated by a technician), or another device that uses the meter installation and billing verification service.

Although not described, MDM system 125 may include logic that provides other services associated with known or conventional MDM systems. For example, MDM system 125 may ingest, store, and analyze meter reading data, as well as provide interactive graphical user interfaces that can make available various types of information to personnel of a utility company, customers, etc. As a result, the meter installation and billing verification service will improve these and other types of functions/services provided.

Billing system 127 includes a network device that generates billing data based on meter data generated by meters and communicated by MIUs. For example, the billing data may relate to water usage. Billing system 127 may provide other functionalities, such as customer portals, online bill pay, e-billing, and so forth. According to an exemplary embodiment, billing system 127 includes a communication interface that allows for communication with MDM system 125, as described herein.

Factory data repository 129 includes a network device that stores certified configuration data of utility meters. For example, the configuration data is certified for data accuracy, integrity, and/or reliability (e.g., by the meter manufacturer via a quality control process). By way of further example, factory data repository 129 may be populated with the certified configuration data by the manufacturer of the meters at or shortly after the manufacture of the meters. According to an exemplary embodiment, the utility meters are water meters. According to other exemplary embodiments, the utility meters may be meters that are different from water meters (e.g., gas meters, electric meters, etc.). According to an exemplary embodiment, the certified configuration data includes data that indicates the number of dials included in the meter, the placement of the decimal with respect to the digits used to represent resource consumption value measured by the meter, and the unit of measure.

According to other exemplary embodiments, the certified configuration data may include additional and/or different types of certified configuration data, as previously described, such as a lay length, a meter size, etc.

According to an exemplary embodiment, the certified configuration data includes an identifier that identifies a meter. According to some implementations, the identifier is unique from any other meter. According to other implementations, the identifier is not unique. For example, the identifier may be a model number, a class number, or another type of identifier that is shared among some other meters. The identifier may correlate to the other certified configuration data (e.g., number of dials, etc.).

Figure 2:
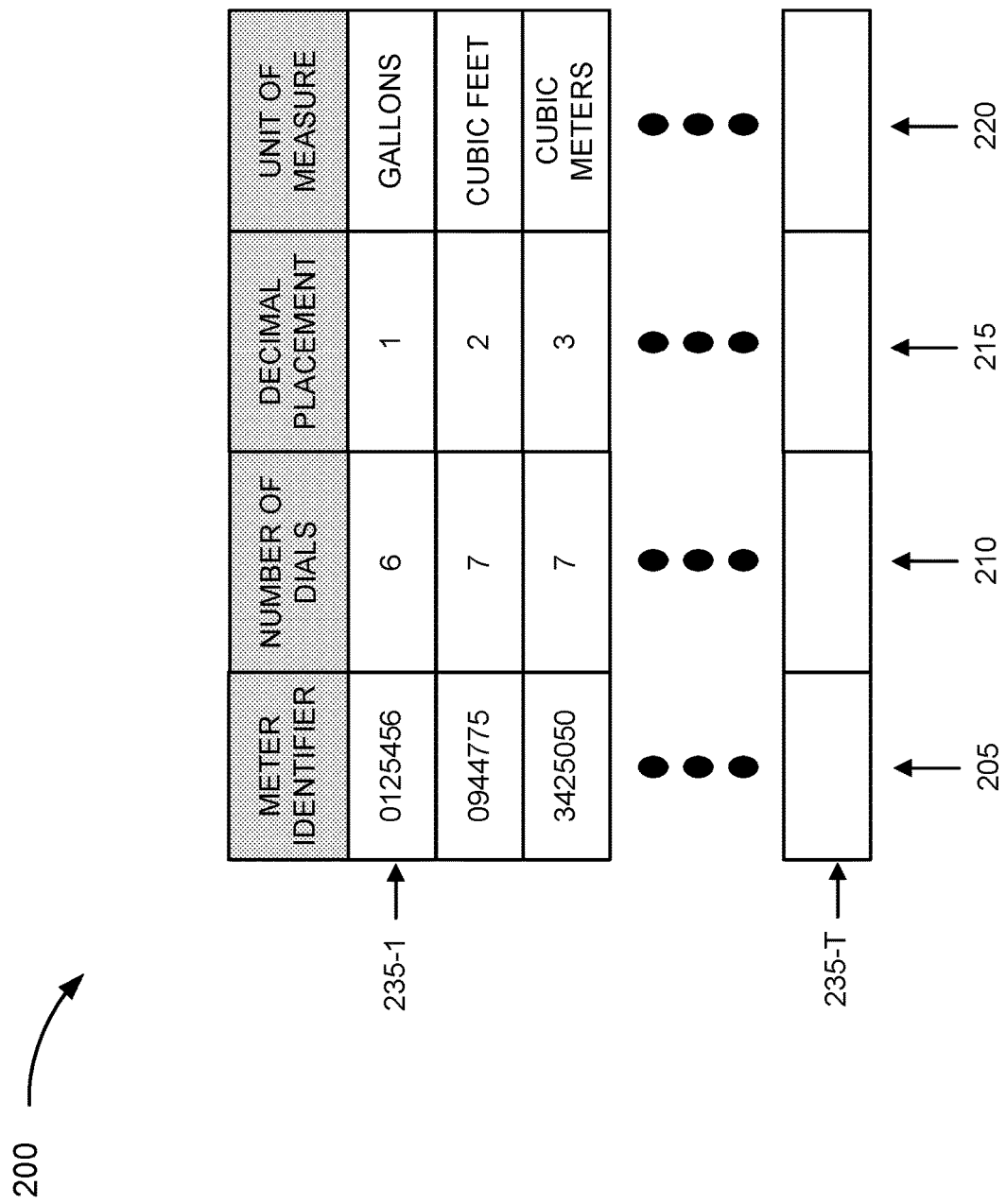
FIG. 2 is a diagram illustrating an exemplary table that stores exemplary certified configuration data.

FIG. 2 is a diagram illustrating exemplary certified configuration data that is used in support of the meter installation and billing verification service. According to an exemplary embodiment, factory data repository 129 stores the certified configuration data. As previously described, the certified configuration data may be certified by the manufacturer of the meters (e.g., as a part of the manufacturing process) and stored in factory data repository 129. According to an exemplary embodiment, the certified configuration data includes an identifier of a meter/MIU that correlates to various instances of other certified configuration data. The certified configuration data may be stored in a table or other suitable data structure or database. By way of further example, a table 200 includes a meter identifier field 205, a number of dials field 210, a decimal placement field 215, and a unit of measure field 220. As further illustrated, table 200 includes records 235-1 through 235-T that each includes a grouping of fields 205 through 220 that may be correlated.

According to other exemplary implementations, the certified configuration data may include additional and/or different instances of data. For example, the certified configuration data may include fields that store certified configuration data relating to a meter size, lay length, type of meter, and/or another type of configuration data (e.g., location, image of a register, meter thread size, etc.). The values in fields 205 through 220, as illustrated in FIG. 2, are merely exemplary.

Meter identifier field 205 stores data indicating an identifier of meter 102, MIU 105, or both. As previously described, the identifier may be unique or not unique. For example, the identifier may be implemented as an equipment identifier, a media access control (MAC) address associated with MIU 105, a model number, a serial number, or another other type of string that identifies meter 102, MIU 105, or both.

Number of dials field 210 stores data indicating the number of dials used by meter 102. For example, for a "straight-reading" meter, meter 102 may include an odometer-like mechanism, which has a number of wheels that each indicate a number pertaining to a total volume (e.g., gallons, cubic feet, cubic meter, etc.) of a resource that is measured (e.g., water, etc.). Alternatively, for example, a "round-reading" meter may include several reading dials in which each reading dial represents a numerical division (e.g., division of 10 or another numerical division) of the total volume of the resource measured. For example, the rounding-reading meter may include a dial for indicating one cubic foot or gallon, another dial for indicating tens of cubic feet or gallons, yet another dial for indicating hundreds of cubic feet or gallons, and so forth. Alternatively, an ultra-sonic meter may not include a dial, but has a display (e.g., a liquid crystal display (LCD), etc.) that displays a string of numbers/digits corresponding to a numerical flow measurement.

Decimal placement field 215 stores data that indicates a decimal place value. For example, with reference to a string of numbers that represents the flow measurement of a resource, the virtual placement of the decimal may be indicated by the number of digits beginning from the leftmost digit or beginning from the rightmost digit of the string of numbers. For example, a one (1) in decimal placement field 215 may indicate that the rightmost digit may represent tenths unit of measure.

Unit of measure field 220 stores data that indicates the unit of measure for a consumption of a resource. For example, the unit of measure is volume (e.g., gallons, cubic feet, cubic meters, etc.) for water.

FIGS. 3A-3E are diagrams illustrating an exemplary process of the meter installation service. Referring to FIG. 3A, according to an exemplary scenario, assume a user 304 (e.g., a meter technician) of wireless station 114 is installing a new meter 102/MIU 105. Wireless station 114 may include an installation tool that assists in the installation process. During the installation, user 304 may obtain an identifier of meter/MIU 307 via wireless station 114. For example, the installation tool of wireless station 114 may capture the identifier using a barcode scanner, a Quick Response (QR) code scanner, radio frequency identification (RFID) technology, or another type of automated process (e.g., visual recognition, etc.).

Referring to FIG. 3B, the installation tool of wireless station 114 obtains the configuration data 310 for the meter/MIU to be installed. For example, the installation tool may obtain the configuration data from an installation order or from another source associated with the utility company that stores the configuration data of the meter/MIU to be installed. Referring to FIG. 3C, the installation tool of wireless station 114 queries for factory configuration data 313. As an example, in response to obtaining the identifier and the configuration data, the installation tool of wireless station 114 generates and transmits a query request 315 to factory data repository 129. The query request includes the identifier. The query request may include additional types of information, such as indicating that the query pertains to the installation of meter 102/MIU 105.

In response to receiving the query request, factory data repository 129 performs a lookup 317 using the identifier. For example, factory data repository 129 compares the identifier with records 235 and meter identifier fields 205, and selects a record 235 that matches the identifier. Based on a result of the lookup, factory data repository 129 provides a query response 319. For example, a query response 321, which includes the certified configuration data correlated to the identifier stored in factory data repository 129, is generated and transmitted to wireless station 114.

Referring to FIG. 3D, wireless station 114 receives the query response, and in response, compares the factory configuration data against the configuration data 325. Referring to FIG. 3E, the installation tool of wireless station 114 validates or invalidates the configuration data 327 based on a result of the comparison. For example, when the configuration data matches the factory configuration data, the installation tool may indicate (e.g., via the GUI of wireless station 114) that the configuration data is valid. Alternatively, when the configuration data does not match the factory configuration data, the installation tool may indicate that the configuration data is invalid.

According to some exemplary implementations, the installation tool of wireless station 114 may perform a post-verification procedure. For example, the installation tool may generate and transmit a message 330 to billing system 127 and/or another network device associated with a utility company (e.g., a home office, etc.) (not illustrated). The message 330 may indicate the outcome of the verification process. When the configuration data is invalid, the installation tool of wireless station 114 may invoke a remedial procedure to accommodate the installation order. For example, the installation tool may select another meter 102/MIU 105 to install based on the installation-based configuration data based on communication with a network device associated with the utility company (not illustrated). Additionally, or alternatively, the message 330 may be used to invoke a dispute procedure. For example, the home office (e.g., a person, a network device, etc.) may use message 330 and other types of information (e.g., the certified configuration data, the installation configuration data, etc.) to confirm the discrepancy between the installation-based configuration data and the certified configuration data.

While FIGS. 3A-3E are diagrams illustrating an exemplary process of the meter installation service, according to other exemplary embodiments, additional and/or different operations may be performed. For example, wireless station 114 may transmit a query response to MDM system 125. In turn, MDM system 125 may query factory data repository 129, and MDM 125 may transmit the query response to wireless station 114. Alternatively, MDM system 125 may perform the comparison between the factory configuration data and the configuration data associated with the meter/MIU being installed. For example, the query request may include the configuration data. MDM system 125 may generate and transmit a message to wireless station 114. The message includes data indicating an outcome of the comparison. The message may further include the certified configuration data.

Figure 4A:
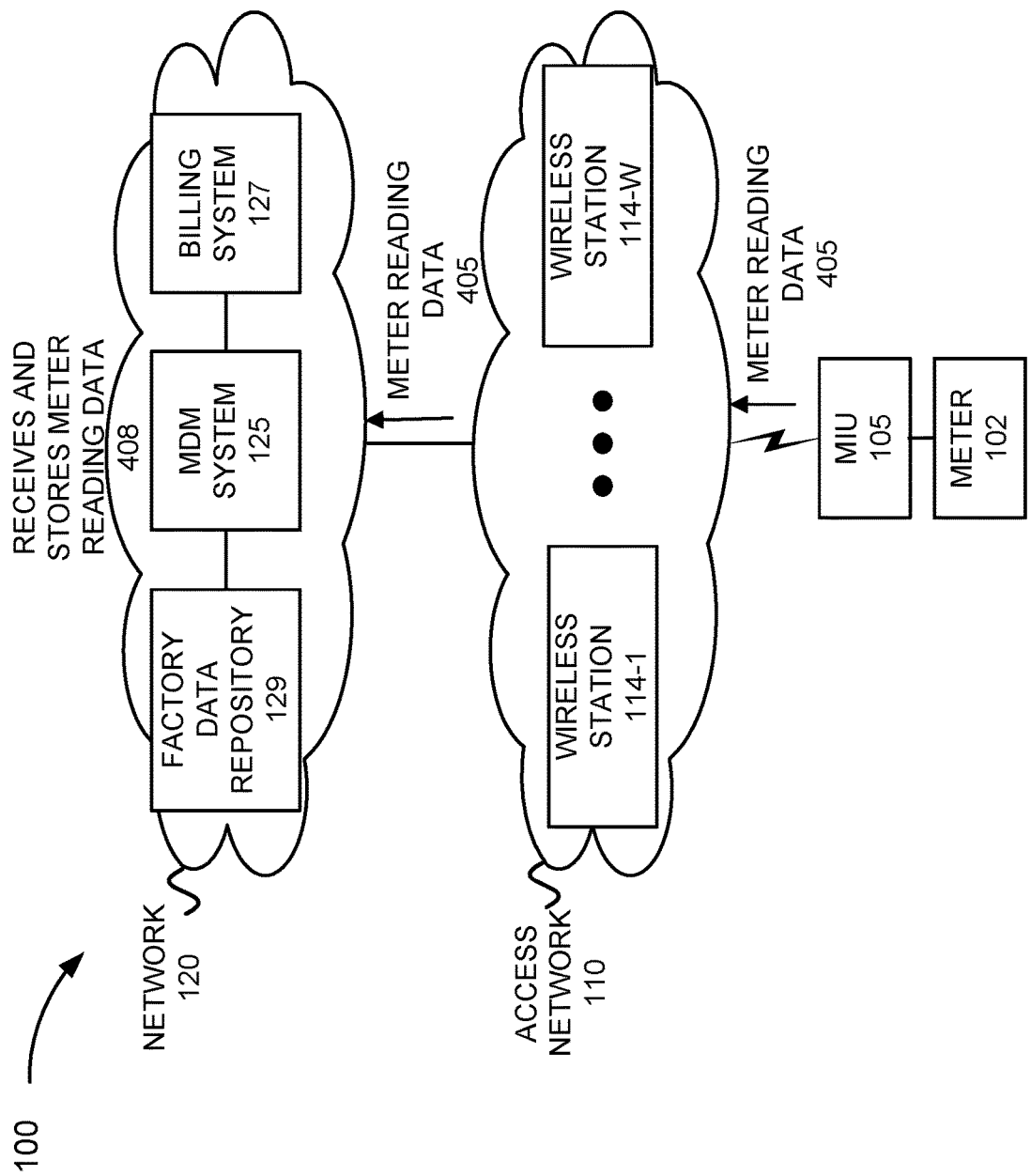

FIGS. 4A-4F are diagrams illustrating an exemplary process of an exemplary embodiment of the billing verification service. Referring to FIG. 4A, according to an exemplary scenario, MIU 105 transmits meter reading data 405 to MDM system 125 via access network 110. MDM system 125 receives and stores the meter reading data 408.

Figure 4B:
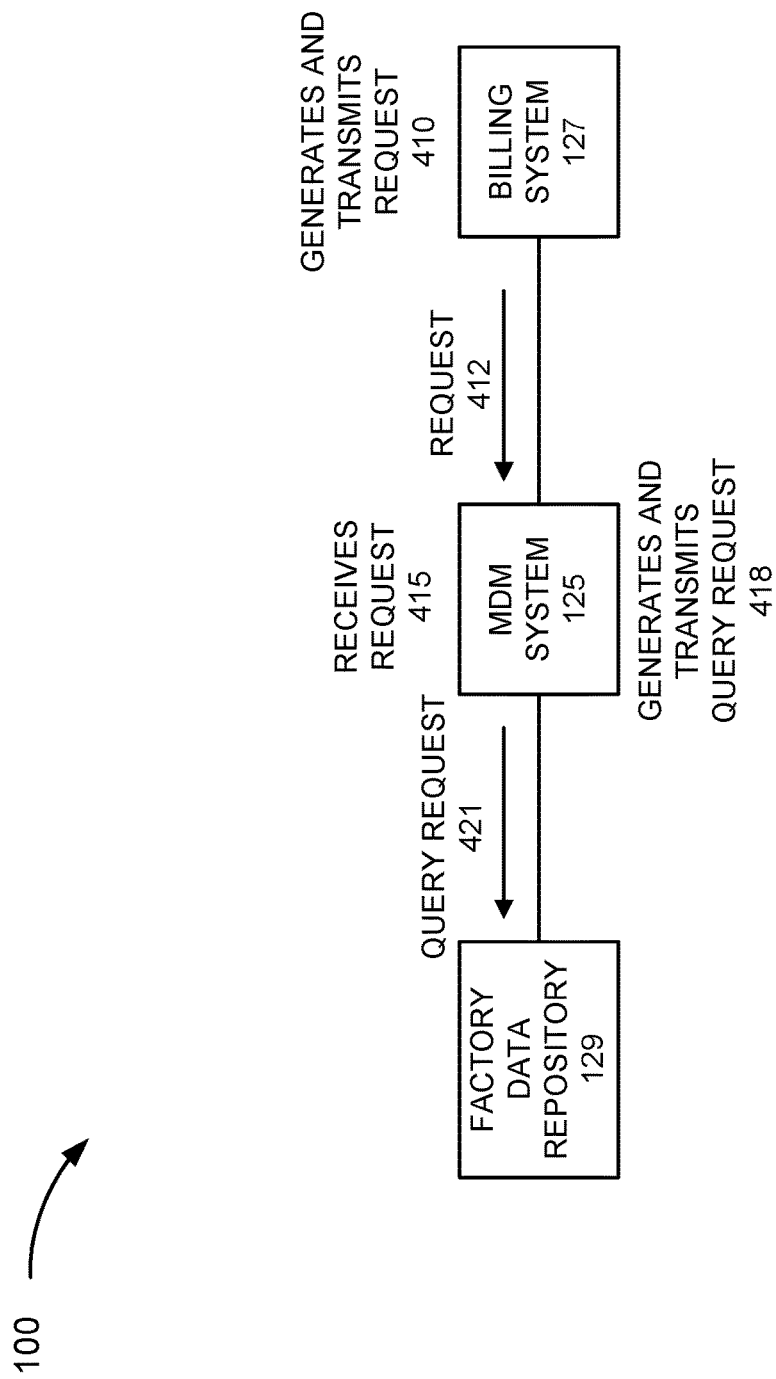

Referring to FIG. 4B, according to billing cycle procedure, billing system 127 generates and transmits a request 410. According to various exemplary implementations, billing system 127 may or may not store the configuration data pertaining to meter 102. In this regard, according to some exemplary implementations, request 412 may include an identifier of meter 102 and/or MIU 105, and the configuration data. According to other exemplary implementations, request 412 may include the identifier and no configuration data.

As further illustrated, MDM system 125 receives the request 415, and generates and transmits a query request 418. A query request 421 is transmitted to factory data repository 129. The query request 421 includes the identifier pertaining to meter 102/MIU 105. Referring to FIG. 4C, factory data repository 129 receives the query request 424, and in response performs a lookup 428. For example, factory data repository 129 uses the identifier to match with identifiers stored in meter identifier field 205. According to this exemplary scenario, assume that factory data repository 129 finds a match. However, when factory data repository 129 does not find a match, factory data repository 129 generates and transmits a query response that indicates no match was found.

Figure 4D:
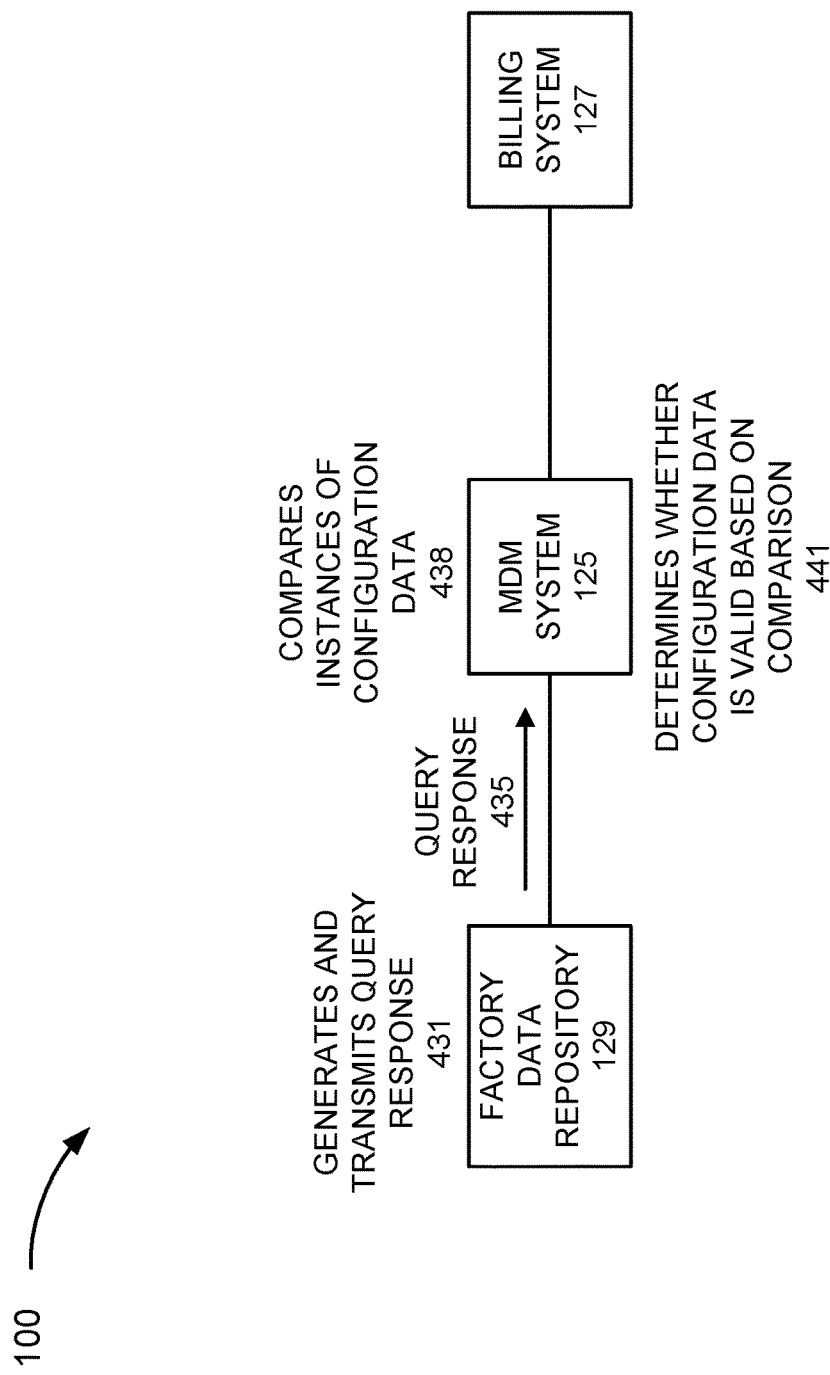

Referring to FIG. 4D, factory data repository 129 generates and transmits a query response 431. A query response 435 may include the certified configuration data that correlates to the identifier. In response to receiving the query response 435, according to an exemplary scenario when request 412 includes configuration data, MDM system 125 compares the instances of configuration data 438. For example, MDM system 125 compares the certified configuration data against the configuration data received from billing system 127. Based on the comparison, MDM system 125 determines whether the configuration data is valid 441.

Referring to FIG. 4E, based on a result of the determination, MDM system 125 generates and transmits a response 445. Depending on the result of the determination, a response 448 may carry, for example, the certified configuration data when it is determined that the configuration data received from billing system 127 did not match the certified configuration data. Alternatively, response 448 may carry, for example, an indication that the configuration data received from billing system 127 matches the certified configuration data (e.g., is valid).

As further illustrated, in response to receiving response 448, billing system 127 updates or validates the configuration data 452. For example, when response 448 includes the certified configuration data, billing system 127 may overwrite or update the invalid configuration data with the certified configuration data. Alternatively, when response 448 indicates that the configuration data is valid, billing system 127 may store data (e.g., a bit) indicating that the configuration data is valid and has been verified. Subsequent to the updating or validating, billing system 127 may use the updated or validated configuration data to generate bills relating to meter 102/MIU 105.

Referring to FIG. 4F, according to an exemplary scenario when request 412 does not include the configuration data but includes the identifier, and subsequent to performing the lookup 428 in FIG. 4C, factory data repository 129 generates and transmits a query response 455. According to this exemplary scenario, assume that factory data repository 129 finds a match. However, when factory data repository 129 does not find a match, factory data repository 129 generates and transmits a query response that indicates no match was found.

A query response 458 may include the certified configuration data that correlates to the identifier. In response to receiving the query response 458, MDM system 125 generates and transmits a response 462. For example, response 465 includes the certified configuration data. In response to receiving the response 465, billing system 127 stores the certified configuration data 468. Billing system 127 uses the certified configuration data to generate bills 471.

While FIGS. 4A-4F are diagrams illustrating exemplary processes of the billing verification service, according to other exemplary embodiments, additional and/or different operations may be performed.

FIG. 5 is a diagram illustrating exemplary components of a device 500 that may be included in one or more of the devices described herein. For example, device 500 may correspond to components included in MIU 105, wireless station 114, MDM system 125, billing system 127, and factory data repository 129. As illustrated in FIG. 5, device 500 includes a bus 505, a processor 510, a memory/storage 515 that stores software 520, a communication interface 525, an input 530, and an output 535. According to other embodiments, device 500 may include fewer components, additional components, different components, and/or a different arrangement of components than those illustrated in FIG. 5 and described herein.

Bus 505 includes a path that permits communication among the components of device 500. For example, bus 505 may include a system bus, an address bus, a data bus, and/or a control bus. Bus 505 may also include bus drivers, bus arbiters, bus interfaces, clocks, and so forth.

Processor 510 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 510 may be implemented as hardware (e.g., a microprocessor, etc.), a combination of hardware and software (e.g., a SoC, an ASIC, etc.), may include one or multiple memories (e.g., cache, etc.), etc.

Processor 510 may control the overall operation or a portion of operation(s) performed by device 500. Processor 510 may perform one or multiple operations based on an operating system and/or various applications or computer programs (e.g., software 520). Processor 510 may access instructions from memory/storage 515, from other components of device 500, and/or from a source external to device 500 (e.g., a network, another device, etc.). Processor 510 may perform an operation and/or a process based on various techniques including, for example, multithreading, parallel processing, pipelining, interleaving, etc.

Memory/storage 515 includes one or multiple memories and/or one or multiple other types of storage mediums. For example, memory/storage 515 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 515 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 515 may include drives for reading from and writing to the storage medium.

Memory/storage 515 may be external to and/or removable from device 500, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 515 may store data, software, and/or instructions related to the operation of device 500.

Software 520 includes an application or a program that provides a function and/or a process. As an example, with reference to MDM system 125, software 520 may include an application that, when executed by processor 510, provides a function of the meter installation and billing verification service, as described herein. Additionally, with reference to billing system 127, factory data repository 129, wireless station 114 described herein, software 520 may include an application that, when executed by processor 510, provides a function of the meter installation and billing verification service, as described herein. Software 520 may also include firmware, middleware, microcode, hardware description language (HDL), and/or other form of instruction. Software 520 may further include an operating system (OS) (e.g., Windows, Linux, Android, proprietary, etc.).

Communication interface 525 permits device 500 to communicate with other devices, networks, systems, and/or the like. Communication interface 525 includes one or multiple wireless interfaces and/or wired interfaces. For example, communication interface 525 may include one or multiple transmitters and receivers, or transceivers. Communication interface 525 may operate according to a protocol stack and a communication standard. Communication interface 525 may include an antenna. Communication interface 525 may include various processing logic or circuitry (e.g., multiplexing/de-multiplexing, filtering, amplifying, converting, error correction, application programming interface (API), etc.). Communication interface 525 may be implemented as a point-to-point interface, a service based interface, etc.

Input 530 permits an input into device 500. For example, input 530 may include a keyboard, a mouse, a display, a touchscreen, a touchless screen, a button, a switch, an input port, speech recognition logic, and/or some other type of visual, auditory, tactile, etc., input component. Output 535 permits an output from device 500. For example, output 535 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.).

Device 500 may perform a process and/or a function, as described herein, in response to processor 510 executing software 520 stored by memory/storage 515. By way of example, instructions may be read into memory/storage 515 from another memory/storage 515 (not shown) or read from another device (not shown) via communication interface 525. The instructions stored by memory/storage 515 cause processor 510 to perform a process described herein. Alternatively, for example, according to other implementations, device 500 performs a process described herein based on the execution of hardware (processor 510, etc.).

Figure 6:
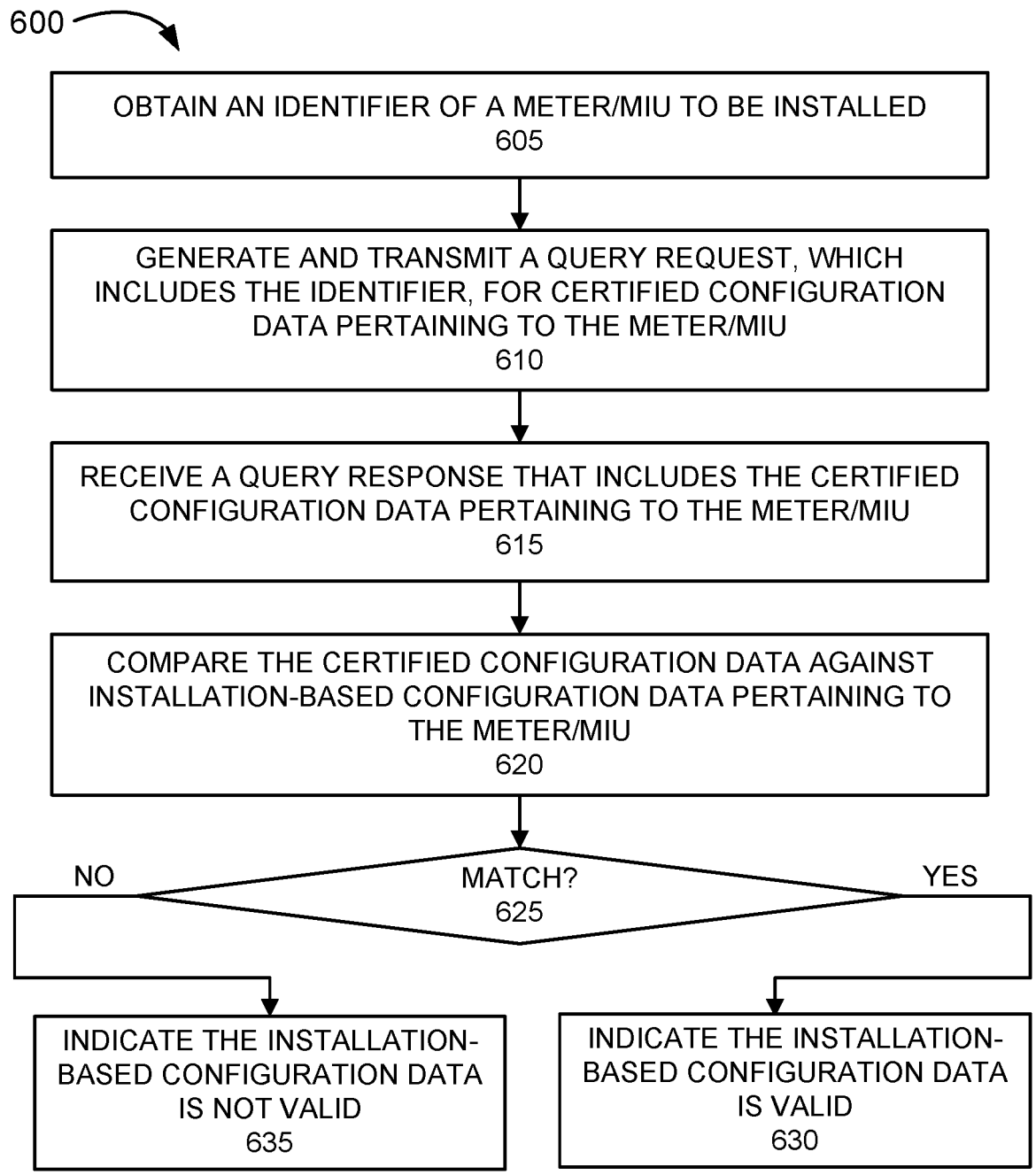
FIG. 6 is a flow diagram illustrating an exemplary process of an exemplary embodiment of the meter installation and billing verification service.

FIG. 6 is a flow diagram illustrating an exemplary process 600 of an exemplary embodiment of the meter installation verification service. According to an exemplary embodiment, wireless station 114 performs steps of process 600. For example, processor 510 may execute software 520 to perform a step illustrated in FIG. 6, and described herein. As previously described, process 600 relates to the installation of a meter/MIU and verification of configuration data of the meter/MIU to be installed. A technician or other user may operate wireless station 114. Wireless station 114 may include an installation tool to facilitate the meter installation verification service, as described herein.

Referring to FIG. 6, in block 605, an identifier of a meter/MIU to be installed is obtained. For example, a wireless station 114 scans, reads, or obtains an identifier associated with meter 102/MIU 105 to be installed.

In block 610, a query request, which includes the identifier, for certified configuration data pertaining to the meter/MIU is generated and transmitted. For example, wireless station 114 generates and transmits the query request, which includes the identifier of meter 102/MIU 105 to be installed, to factory data repository 129.

In block 615, a query response that includes the certified configuration data pertaining to the meter/MIU is received. For example, wireless station 114 receives the query response that includes the certified configuration data pertaining to meter 102/MIU 105 to be installed.

In block 620, the certified configuration data is compared against installation-based configuration data pertaining to the meter/MIU. For example, wireless station 114 compares the certified configuration data against installation-based configuration data pertaining to meter 102/MIU 105. The installation-based configuration data may be the configuration data associated with the installation of meter 102/MIU 105 (e.g., included in an installation order).

In block 625, it is determined whether the certified configuration data matches the installation-based configuration data pertaining to the meter/MIU. For example, in response to receiving the certified configuration data, wireless station 114 compares the certified configuration data against the installation-based configuration data. By way of further example, wireless station 114 compares the number of dials, the placement of the decimal with respect to a meter reading, and the unit of measure between these instances of configuration data.

When it is determined that the certified configuration data matches the installation-based configuration data (block 625—YES), an indication that the installation-based configuration data is valid is provided (block 630). For example, wireless station 114 provides a cue to the user that indicates the installation-based configuration data is valid. By way of further example, the installation tool may display a GUI that indicates the installation-based configuration data is valid.

When it is determined that the certified configuration data does not match the installation-based configuration data (block 625-NO), an indication that the installation-based configuration data is not valid is provided (block 635). For example, wireless station 114 provides a cue to the user that indicates the installation-based configuration data is not valid. By way of further example, the installation tool may display a GUI that indicates the installation-based configuration data is not valid. For example, the GUI may indicate that the unit of measure for the installation-based configuration data indicates cubic feet, while the certified configuration data indicates that the unit of measure is gallons.

Although FIG. 6 illustrates an exemplary process 600 of the meter installation verification service, according to other embodiments, process 600 may include additional operations, fewer operations, and/or different operations than those illustrated in FIG. 6, and described herein. For example, according to other exemplary embodiments, wireless station 114 may perform or invoke another procedure based on the validation or invalidation of the installation-based configuration data, as previously described. Additionally, or alternatively, according to other exemplary embodiments, process 600 may include other variations. For example, wireless station 114 may transmit the query request to MDM system 125. MDM system 125 may transmit the query request to factory data repository 129, and receive the query response from factory data repository 129. In response to receiving the query response, MDM system 125 may transmit the query response to wireless station 114.

According to yet other exemplary embodiments, wireless station 114 may transmit the query request to MDM system 125. The query request includes the identifier and the installation-based configuration data. Subsequent to receiving the query response from factory data repository 129, MDM system 125 compares the certified configuration data against the installation-based configuration data. MDM system 125 generates and transmits a query response, which indicates the result of the comparison, to wireless station 114.

According to various exemplary embodiments, process 600 has been described with the assumption that the query response includes the certified configuration data. However, in the event that a lookup of configuration data is unsuccessful (e.g., no match between identifiers), the query response would indicate that no certified configuration data is available or similar indication.

According to an exemplary embodiment, the installation tool of wireless station 114 may perform a post-verification procedure. For example, the installation tool may generate and transmit a message to billing system 127 and/or another network device associated with a utility company (e.g., a home office, etc.). The message may indicate the outcome of the verification process. In this way, the state of the meter 102/MIU 105 (e.g., validated or not validated) may be managed by storing information indicating the outcome and current state of the device. Additionally, for example, the installation tool of wireless station 114 may provide a GUI that allows a user (e.g., a field technician, etc.) to capture an image depicting a register or another component and/or configuration of meter 102/MIU 105. The image information may be transmitted and stored and/or used for further analysis regarding validation/invalidation.

Figure 7:
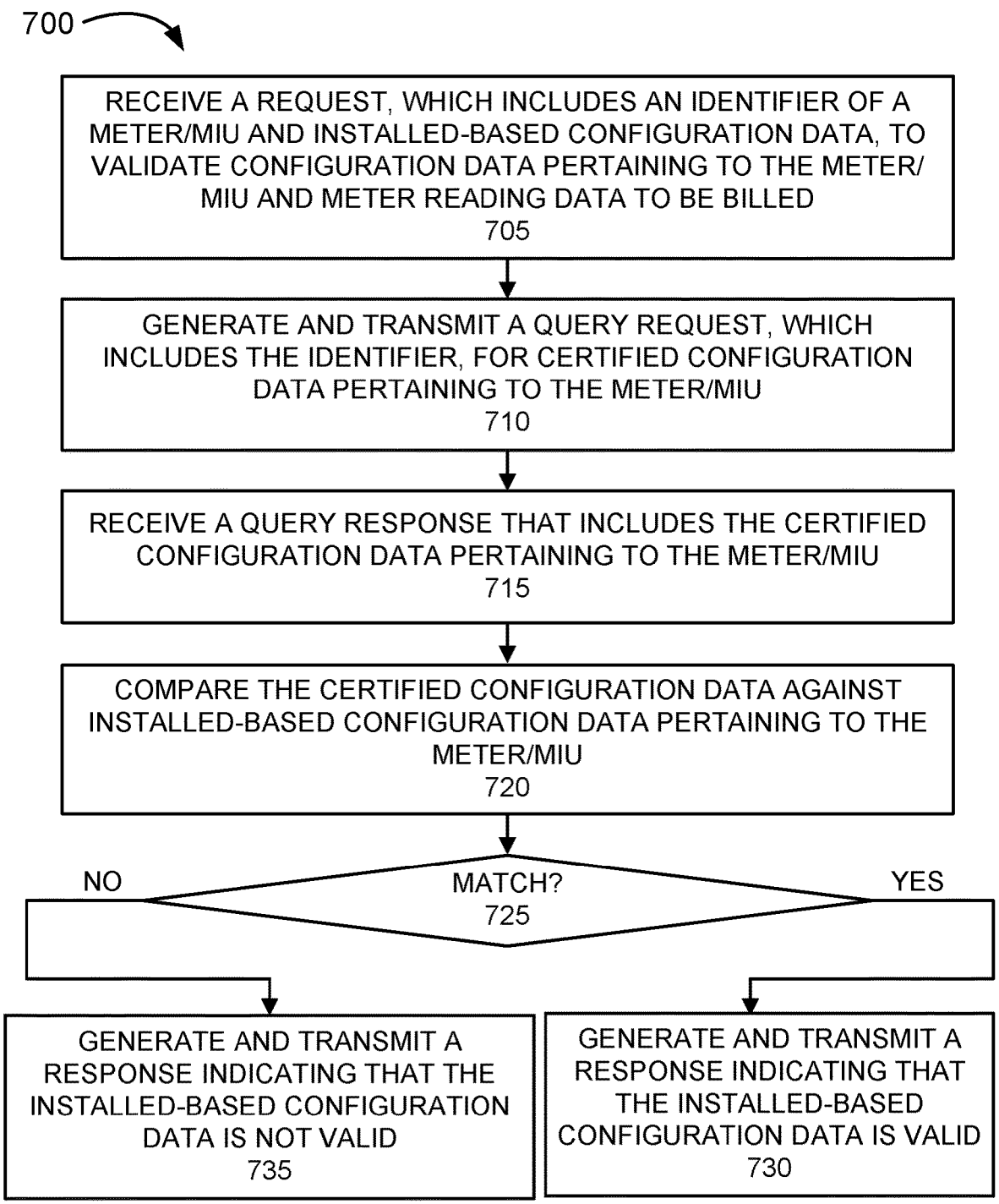
FIG. 7 is a flow diagram illustrating another exemplary process of an exemplary embodiment of the meter installation and billing verification service.

FIG. 7 is a flow diagram illustrating another exemplary process 700 of an exemplary embodiment of the billing verification service. According to an exemplary embodiment, MDM system 125 performs steps of process 700. For example, processor 510 may execute software 520 to perform a step illustrated in FIG. 7, and described herein. As previously described, process 700 relates to a billing process that includes verifying configuration data associated with meter 102/MIU 105. According to an exemplary embodiment, billing system 127 stores installed-based configuration data of meter 102/MIU 105. For example, the billing system of a water utility company may store configuration data of the installed meter 102/MIU 105 from which the meter reading data to be billed is obtained.

Referring to FIG. 7, in block 705, a request, which includes an identifier of a meter/MIU and installed-based configuration data, to validate configuration data pertaining to the meter/MIU and meter reading data to be billed is received. For example, MDM system 125 receives a request from billing system 127 to validate configuration data associated with meter 102/MIU 105 and meter reading data to be billed. The request includes the identifier of meter 102/MIU 105 and installed-based configuration data.

In block 710, a query request, which includes the identifier, for certified configuration data pertaining to the meter/

MIU is generated and transmitted. For example, in response to receiving the request to validate the configuration data, MDM system 125 generates and transmits a query request, which includes the identifier of meter 102/MIU 105, to factory data repository 129.

In block 715, a query response that includes the certified configuration data pertaining to the meter/MIU is received. For example, MDM system 125 receives the query response that includes the certified configuration data pertaining to meter 102/MIU 105 to be billed.

In block 720, the certified configuration data is compared against installed-based configuration data pertaining to the meter/MIU. For example, MDM system 125 compares the certified configuration data against installed-based configuration data pertaining to meter 102/MIU 105. The installed-based configuration data may be the configuration data associated with the installed meter 102/MIU 105.

In block 725, it is determined whether the certified configuration data matches the installation-based configuration data pertaining to the meter/MIU. For example, in response to receiving the certified configuration data, MDM system 125 compares the certified configuration data against the installation-based configuration data. By way of further example, MDM system 125 compares the number of dials, the placement of the decimal, and the unit of measure between these instances of configuration data.

When it is determined that the certified configuration data matches the installation-based configuration data (block 725—YES), a response, which indicates that the installed-based configuration data is valid, is generated and transmitted (block 730). For example, MDM system 125 generates and transmits a response to billing system 127 indicating that the installed-based configuration data is valid.

When it is determined that the certified configuration data does not match the installation-based configuration data (block 725-NO), a response, which indicates that the installed-based configuration data is not valid, is generated and transmitted (block 735). For example, MDM system 125 generates and transmits a response to billing system 127 indicating that the installed-based configuration data is not valid.

Although FIG. 7 illustrates an exemplary process 700 of the meter installation and billing verification service, according to other embodiments, process 700 may include additional operations, fewer operations, and/or different operations than those illustrated in FIG. 7, and described herein. For example, according to other exemplary embodiments, MDM system 125 and/or billing system 127 may perform or invoke another procedure based on the validation or invalidation of the installed-based configuration data.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

Embodiments described herein may be implemented in many different forms of software executed by hardware. For example, a process or a function may be implemented as "logic," a "component," or an "element." The logic, the component, or the element, may include, for example, hardware (e.g., processor 510, etc.), or a combination of hardware and software (e.g., software 520).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

The terms "about" and "approximately" shall generally mean an acceptable degree of error or variation for the quantity measured given the nature or precision of the measurements. Typical, exemplary degrees of error or variation are within 20 percent (%), preferably within 10%, and more preferably within 5% of a given value or range of values. Numerical quantities given in this description are approximate unless stated otherwise, meaning that the term "about" or "approximately" can be inferred when not expressly stated.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 510) of a device.

No element, act, or instruction set forth in this description should be construed as critical or essential to the embodiments described herein unless explicitly indicated as such. All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. §

112(f) unless the claim element expressly includes the phrase "means for" or "step for."

What is claimed is:

1. A network device comprising:
a memory, wherein the memory stores instructions; and
a processor, wherein the processor executes the instructions to:
receive, from a billing system, a request to validate first configuration data, wherein the request includes an identifier of at least one of a meter or a meter interface unit (MIU) of the meter, and the first configuration data that includes data indicating a number of dials of the meter, a decimal placement of the meter, and a unit of measure for consumption of the meter;
generate, in response to receiving the request, a query request that includes the identifier and a request for second configuration data of the meter, wherein the second configuration data includes data indicating a certified number of dials of the meter, a certified decimal placement of the meter, and a certified unit of measure for consumption of the meter, and wherein the second configuration data is certified for data accuracy, integrity, and reliability and indicates a configuration intended by a manufacturer for the meter;
transmit, to a first network device, the query request;
receive, from the first network device, a query response that includes the second configuration data;
compare the first configuration data and the second configuration data;
determine, based on the comparison, whether the first configuration data is valid;
generate, based on the determination, a response that includes the identifier and data that indicates that the first configuration data is valid or not valid; and
transmit, to the billing system, the response.

2. The network device of claim 1, wherein the first configuration data further includes data indicating at least one of a lay length or a meter size of the meter and the second configuration data further includes data indicating at least one of a certified lay length of the meter or a certified meter size of the meter.

3. The network device of claim 1, wherein the first configuration data indicates a configuration of the meter or the MIU to be installed or that has been installed.

4. The network device of claim 1, wherein the unit of measure for consumption of the meter included in the first configuration data is gallons or cubic feet.

5. The network device of claim 1, wherein the decimal placement of the meter included in the first configuration data indicates a location where to place a decimal relative to a string of numbers that represents a water consumption value.

6. The network device of claim 1, wherein the number of dials of the meter included in the first configuration data indicates a total number of digits used to represent a water consumption value.

7. The network device of claim 1, wherein the meter is a water meter that measures water consumption.

8. The network device of claim 1, wherein the second configuration data is generated as a part of a manufacturing process for the meter.

9. A method comprising:
receiving, by a network device from a billing system, a request to validate first configuration data, wherein the request includes an identifier of at least one of a meter or a meter interface unit (MIU) of the meter, and the first configuration data that includes data indicating a number of dials of the meter, a decimal placement of the meter, and a unit of measure for consumption of the meter;
generating, by the network device in response to receiving the request, a query request that includes the identifier and a request for second configuration data of the meter, wherein the second configuration data includes data indicating a certified number of dials of the meter, a certified decimal placement of the meter, and a certified unit of measure for consumption of the meter, and wherein the second configuration data is certified for data accuracy, integrity, and reliability and indicates a configuration intended by a manufacturer for the meter;
transmitting, by the network device to a first network device, the query request;
receiving, by the network device from the first network device, a query response that includes the second configuration data;
comparing, by the network device, the first configuration data and the second configuration data;
determining, by the network device based on the comparison, whether the first configuration data is valid;
generating, by the network device based on the determination, a response that includes the identifier and data that indicates that the first configuration data is valid or not valid; and
transmitting, by the network device to the billing system, the response.

10. The method of claim 9, wherein the first configuration data further includes data indicating at least one of a lay length or a meter size of the meter and the second configuration data further includes data indicating at least one of a certified lay length of the meter or a certified meter size of the meter.

11. The method of claim 9, wherein the first configuration data indicates a configuration of the meter or the MIU to be installed or that has been installed.

12. The method of claim 9, wherein the unit of measure for consumption of the meter included in the first configuration data is gallons or cubic feet.

13. The method of claim 9, wherein the decimal placement of the meter included in the first configuration data indicates a location where to place a decimal relative to a string of numbers that represents a water consumption value.

14. The method of claim 9, wherein the number of dials of the meter included in the first configuration data indicates a total number of digits used to represent a water consumption value.

15. The method of claim 9, wherein the meter is a water meter that measures water consumption.

16. The method of claim 15, wherein the second configuration data is generated as a part of a manufacturing process for the meter.

17. A non-transitory computer-readable storage medium storing instructions executable by a processor of a network device, which when executed cause the network device to:
receive, from a billing system, a request to validate first configuration data, wherein the request includes an identifier of at least one of a meter or a meter interface unit (MIU) of the meter, and the first configuration data that includes data indicating a number of dials of the meter, a decimal placement of the meter, and a unit of measure for consumption of the meter;

generate, in response to receiving the request, a query request that includes the identifier and a request for second configuration data of the meter, wherein the second configuration data includes data indicating a certified number of dials of the meter, a certified decimal placement of the meter, and a certified unit of measure for consumption of the meter, and wherein the second configuration data is certified for data accuracy, integrity, and reliability and indicates a configuration intended by a manufacturer for the meter;

transmit, to a first network device, the query request;

receive, from the first network device, a query response that includes the second configuration data;

compare the first configuration data and the second configuration data;

determine, based on the comparison, whether the first configuration data is valid;

generate, based on the determination, a response that includes the identifier and data that indicates that the first configuration data is valid or not valid; and transmit, to the billing system, the response.

18. The non-transitory computer-readable storage medium of claim 17, wherein the first configuration data further includes data indicating at least one of a lay length or a meter size of the meter and the second configuration data further includes data indicating at least one of a certified lay length of the meter or a certified meter size of the meter.

19. The non-transitory computer-readable storage medium of claim 17, wherein the decimal placement of the meter included in the first configuration data indicates a location where to place a decimal relative to a string of numbers that represents a water consumption value.

20. The non-transitory computer-readable storage medium of claim 17, wherein the number of dials of the meter included in the first configuration data indicates a total number of digits used to represent a water consumption value.

* * * * *